US011829681B2

(12) United States Patent
Nathanson (10) Patent No.: US 11,829,681 B2
(45) Date of Patent: *Nov. 28, 2023

(54) VIDEO CONFERENCING WITH COLLABORATIVE MUSIC LISTENING

(71) Applicant: Kevin M. Nathanson, Harrison, NY (US)

(72) Inventor: Kevin M. Nathanson, Harrison, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/100,156

(22) Filed: Jan. 23, 2023

(65) Prior Publication Data

US 2023/0153059 A1 May 18, 2023

Related U.S. Application Data

(63) Continuation of application No. 17/970,123, filed on Oct. 20, 2022, which is a continuation of application No. 17/481,171, filed on Sep. 21, 2021, now Pat. No. 11,507,344.

(60) Provisional application No. 63/083,129, filed on Sep. 25, 2020.

(51) Int. Cl.
*G06F 3/16* (2006.01)
*G06F 3/0483* (2013.01)
*H04N 7/15* (2006.01)
*G06F 3/0482* (2013.01)

(52) U.S. Cl.
CPC ............ *G06F 3/165* (2013.01); *G06F 3/0482* (2013.01); *G06F 3/0483* (2013.01); *H04N 7/152* (2013.01); *H04N 7/155* (2013.01)

(58) Field of Classification Search
CPC ........ G06F 3/16; G06F 3/0483; G06F 3/0482; H04N 7/15; H04N 7/147
USPC .............................. 348/14.01–14.16
See application file for complete search history.

(56) References Cited

U.S. PATENT DOCUMENTS

2015/0304375 A1* 10/2015 Dhillon ............... H04L 65/1089
370/259

OTHER PUBLICATIONS

Mobile Terminal Wireless Communication BR PI0621673 A2 (De Leon David et al.); Date Published: Dec. 20, 2011.*

* cited by examiner

*Primary Examiner* — Melur Ramakrishnaiah
(74) *Attorney, Agent, or Firm* — VOLPE AND KOENIG, P.C.; Daniel Golub (57) ABSTRACT

A system, method, and non-transitory computer readable media including instructions for a group music sharing session during a video conference. A video conference may be displayed on a user interface of one or more endpoint devices. A group music sharing session may be initiated with two or more members of the video conference. Participants of the group music sharing sessions may select one or more songs. The selected songs and music information may be retrieved from a multimedia server. A playlist comprising the selected songs may be generated and displayed on the user interface of the endpoint devices of the participants. A participant may select a song from the playlist. The selected song may be played simultaneously on the endpoint devices of the participants. The music information may be displayed on the user interface of the endpoint devices of the participation.

16 Claims, 8 Drawing Sheets

VIDEO CONFERENCING WITH COLLABORATIVE MUSIC LISTENING

CROSS REFERENCE TO RELATED APPLICATIONS

This application is a continuation of U.S. patent application Ser. No. 17/970,123 filed on October 2022, which claims benefit to U.S. patent application Ser. No. 17/481,171 filed on Sep. 21, 2021, which claims benefit to U.S. Provisional Application No. 63/083,129 filed on Sep. 25, 2020. The full disclosures of these applications are incorporated herein by reference.

TECHNICAL FIELD

The present disclosure generally relates to the field of video conferencing, and, more particularly, to a platform that allows users to video conference while collaboratively listening to and sharing music.

BACKGROUND

Video conferencing applications allow people to communicate with each other in remote locations through audio and video media in real time. Conventional video conferencing platforms are directed to facilitating conversations between a number of remote users.

SUMMARY

The present disclosure provides a system, method, and non-transitory computer readable media including instructions for a group music sharing session during a video conference. A video conference may be displayed on a user interface of one or more endpoint devices. A group music sharing session may be initiated with two or more members of the video conference. Participants of the group music sharing sessions may select one or more songs. The selected songs and music information may be retrieved from a multimedia server. A playlist comprising the selected songs may be generated and displayed on the user interface of the endpoint devices of the participants. A participant may select a song from the playlist. The selected song may be played simultaneously on the endpoint devices of the participants. The music information may be displayed on the user interface of the endpoint devices of the participants.

BRIEF DESCRIPTION OF THE DRAWINGS

The drawings described below are for illustration purposes only. The drawings are not intended to limit the scope of the present disclosure.

DETAILED DESCRIPTION

The present disclosure is described in more detail with reference to exemplary embodiments thereof as shown in the appended drawing. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

The present disclosure is related to video conferencing, and, more particularly, to a platform that allows users to video conference while collaboratively listening to and sharing music. The following system may allow multiple users to video conference with one another while using a media player to simultaneously listen to music that is synchronized across each user's device. Additionally, the system may allow users to suggest songs for the group to listen to by queuing up songs for a user in control of the music (i.e., "in control of the aux"). The system may also allow users to view the cover art and lyrics of a song to further their engagement with the music. Users may be able to independently control the volume of the music and the volume of the video conference on their device.

During a video conferencing session described herein, participants may communicate with each other via voice, video, and screen sharing. Screen sharing may include sharing content of the presenter's screen which includes graphics, video, images, and documents with other attendee participants. Endpoint devices may be operated by the video conferencing participants and can transmit and receive voice, video, and screen sharing content during a web conferencing session. Each of the endpoint devices represents participants. The endpoint devices may include computers, tablet PCs, and smart phones that are widely used in the workplace as well as at home. Each participant may be a presenter that shares information, an attendee that receives information, or both presenter and attendee. Roles of the participants can dynamically change between presenter and attendee during the same video conferencing session.

Figure 1:
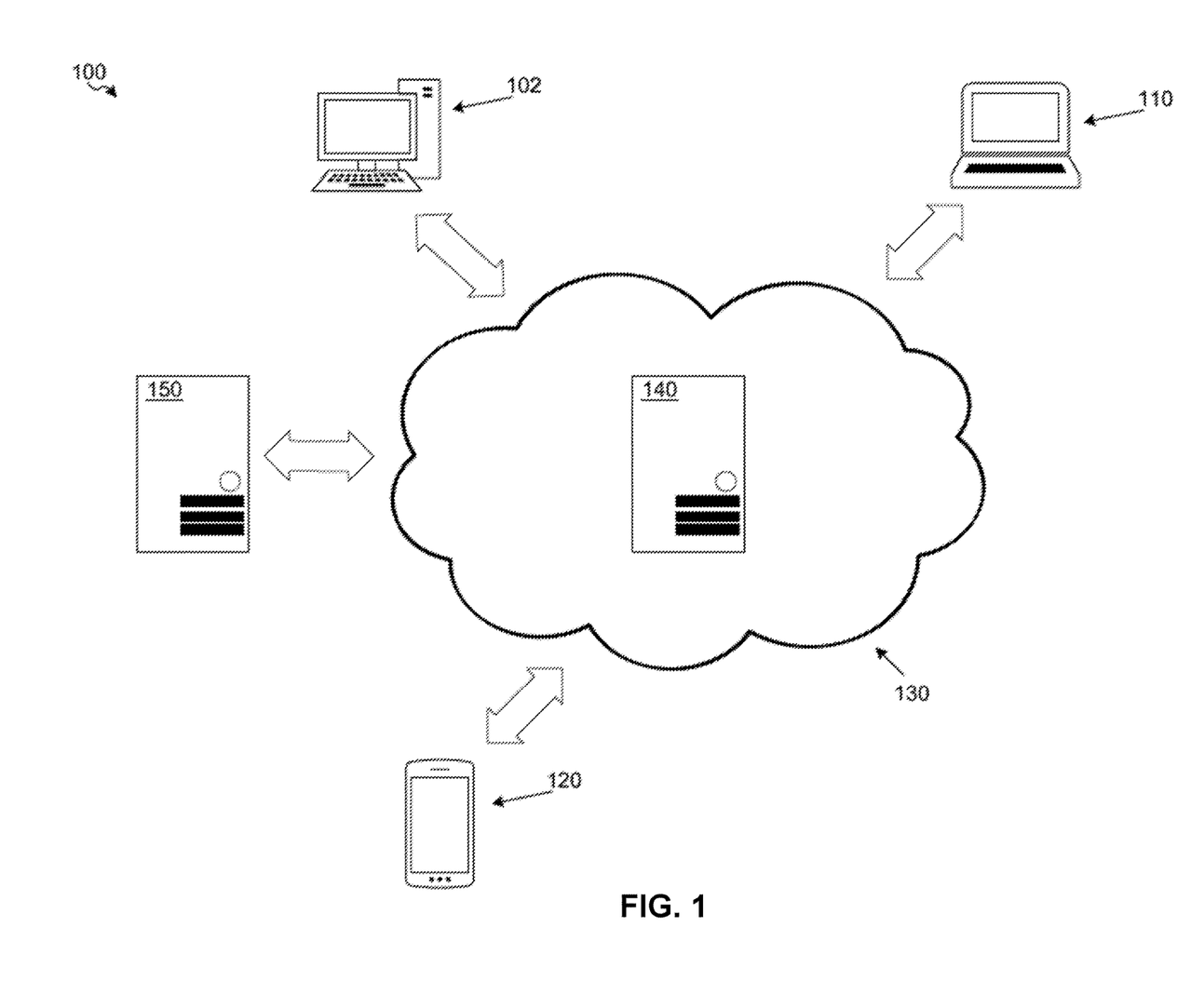
FIG. 1 is a diagram of a system for video conferencing and collaborative music listening, according to some embodiments of the present disclosure.

Referring to FIG. 1, a diagram of a system 100 for video conferencing is shown. A communications server 140 may be coupled to a network 130. The communications server 140 may be coupled to one or more endpoint devices and one or more external servers through the network 130. For example, the communications server 140 may be coupled, via the network 130, to a first endpoint device 102 (e.g., a desktop computer), a second endpoint device 110 (e.g., a laptop computer), and a third endpoint device 120 (e.g., a mobile device), which may be collectively referred to as "the endpoint devices." The communications server 140 may also be coupled, via the network 130, to a multimedia server 150.

For purposes of illustrating a clear example, FIG. 1 shows a limited number of elements, but there may be any number of certain elements shown as well as additional elements not shown. For example, the communications server 140 may represent an instance among a large plurality of instances of an application server in a data center, cloud computing environment, or other mass computing environment. Three endpoint devices 102, 110, and 120 and a single multimedia server 150 are shown in FIG. 1. However, there may be any number of endpoint devices 102, 110, and 120 and multimedia servers 150 or any other external servers.

The communications server 140 may host a video conferencing meeting. The communications server 140 may transmit and receive video, image, text, and audio data to and from the multimedia server 150 and the endpoint devices 102, 110, 120.

Each of the endpoint devices 102, 110, 120 may include a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the endpoint devices 102, 110, 120 may include an integrated or separate display unit such as a computer screen, TV screen or other display. The endpoint devices 102, 110, 120 may be any of mobile or stationary computers including desktop computers, laptops, netbooks, ultrabooks, tablet computers, smartphones, etc. Typically the GPU and CPU may manage separate hardware memory spaces. For example, the CPU memory may be used primarily for storing program instructions and data associated with application programs, whereas the GPU memory may have a high-speed bus connection to the GPU and may be directly mapped to row/column drivers or driver circuits associated with a liquid crystal display (LCD) that serves as the display. In one embodiment, the network 130 may be the Internet.

The endpoint devices 102, 110, 120 may host an application that allows each of the endpoint devices 102, 110, 120 to communicate with the communications server 140. The communications server 140 may maintain a plurality of accounts, each associated with one of the endpoint devices 102, 110, 120 and/or one or more users of the client computers. One or more of the endpoint devices 102, 110, and 120 may participate in the video conferencing session.

The multimedia server 150 may host a music streaming service. In an example, the multimedia server 150 may be separately located from the communications server 140. Alternatively, the multimedia server 150 may be co-located with the communications server 140. The communications server 140 and the multimedia server 150 may be operated by the same entity, or the multimedia server 150 may be a conventional music streaming service operated by a separate entity (e.g., Spotify, Google Play Music, Pandora, YouTube Music, iTunes, Apple Music, etc.). The communications server 140 may be in direct communication with the multimedia server 150. Alternatively, the communications server 140 may communicate with the multimedia server 150 through the endpoint devices 102, 110, 120.

The techniques described herein may be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are programmed to perform the techniques. The special-purpose computing devices may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the above techniques. The special-purpose computing devices may be desktop computer systems, portable computer systems, handheld devices, networking devices or any other device that incorporates hard-wired and/or program logic to implement the techniques.

Figure 2:
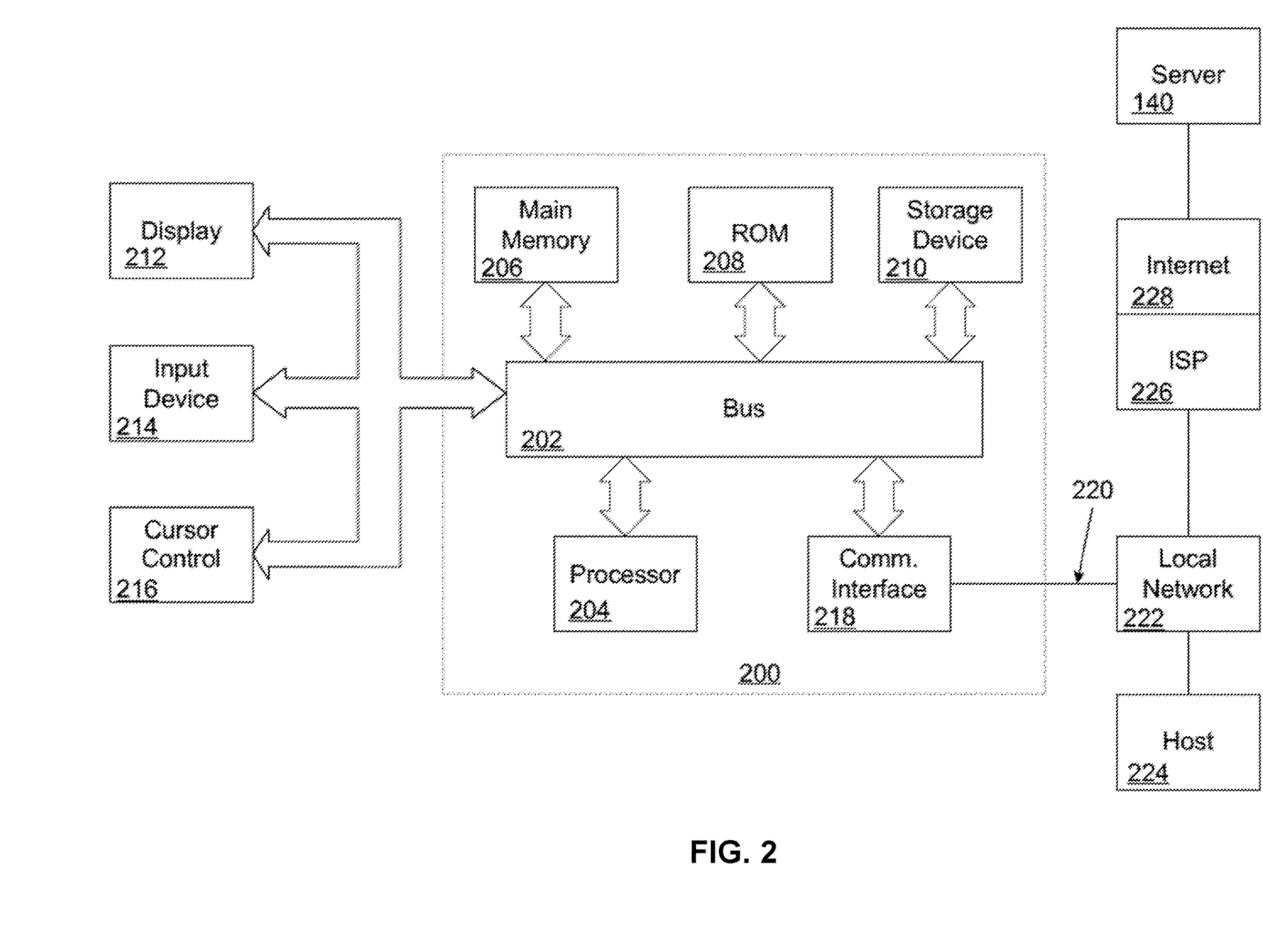
FIG. 2 is a diagram that illustrates a computer system, according to some embodiments of the present disclosure.

Referring now to FIG. 2, a diagram that illustrates a computer system 200 upon which the platform described above may be implemented is shown. The computer system 200 may be included in one or more of the endpoint devices 102, 110, 120.

The computer system 200 may include a bus 202 or other communication mechanism for communicating information, and a hardware processor 204 coupled with the bus 202 for processing information. The hardware processor 204 may be, for example, a general purpose microprocessor.

The computer system 200 may also include a main memory 206, such as a random access memory (RAM) or other dynamic storage device, coupled to bus 202 for storing information and instructions to be executed by processor 204. The main memory 206 also may be used for storing temporary variables or other intermediate information during execution of instructions to be executed by the processor 204. The instructions, when stored in non-transitory storage media accessible to processor 204, may render the computer system 200 into a special-purpose machine that is customized to perform the operations specified in the instructions.

The computer system 200 may further include a read only memory (ROM) 208 or other static storage device coupled to the bus 202 for storing static information and instructions for the processor 204. A storage device 210, such as a magnetic disk or optical disk, may be coupled to the bus 202 for storing information and instructions.

The computer system 200 may be coupled via the bus 202 to a display 212 for displaying information to a computer user. An input device 214, including alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204 and for controlling cursor movement on the display 212. The cursor control 216 may have two degrees of freedom in two axes, a first axis (e.g., x) and a second axis (e.g., y), that allows the device to specify positions in a plane.

The computer system 200 may implement the techniques described herein using customized hard-wired logic, one or more ASICs or FPGAs, firmware and/or program logic which in combination with the computer system 200 causes or programs the computer system 200 to be a special-purpose machine. The techniques herein may be performed by the computer system 200 in response to the processor 204 executing one or more sequences of one or more instructions contained in the main memory 206. The instructions may be read into main memory 206 from another storage medium, such as the storage device 210. Execution of the sequences of instructions contained in the main memory 206 may cause the processor 204 to perform the process steps described herein. In alternative example, hard-wired circuitry may be used in place of or in combination with software instructions.

The term "storage media" as used herein refers to any non-transitory media that store data and/or instructions that cause a machine to operate in a specific fashion. The storage media may comprise non-volatile media and/or volatile media. Non-volatile media may include, for example, optical or magnetic disks, such as the storage device 210. Volatile media may include dynamic memory, such as the main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media may be distinct from, but may be used in conjunction with, transmission media. Transmission media may participate in transferring information between storage media. For example, transmission media may include coaxial cables, copper wire and fiber optics, including the wires that comprise the bus 202. Transmission media may also take the form of acoustic or light waves, such as those generated during radio-wave and infra-red data communications.

Various forms of media may be involved in carrying one or more sequences of one or more instructions to the processor 204 for execution. For example, the instructions may initially be carried on a magnetic disk or solid state drive of a remote computer. The remote computer may load the instructions into its dynamic memory and may send the instructions over a telephone line using a modem. A modem local to the computer system 200 may receive the data on the telephone line and use an infra-red transmitter to convert the data to an infra-red signal. An infra-red detector may receive the data carried in the infra-red signal and appropriate circuitry may place the data on the bus 202. The bus 202 may carry the data to the main memory 206, from which the processor 204 may retrieve and execute the instructions. The instructions received by the main memory 206 may optionally be stored on the storage device 210 either before or after execution by the processor 204.

The computer system 200 may also include a communication interface 218 coupled to bus 202. The communication interface 218 may provide a two-way data communication coupling to a network link 220 that is connected to a local network 222. For example, the communication interface 218 may be an integrated services digital network (ISDN) card, cable modem, satellite modem, or a modem to provide a data communication connection to a corresponding type of telephone line. As another example, the communication interface 218 may be a local area network (LAN) card to provide a data communication connection to a compatible LAN. Wireless links may also be implemented. In any such implementation, the communication interface 218 may send and receive electrical, electromagnetic, or optical signals that carry digital data streams representing various types of information.

The network link 220 may provide data communication through one or more networks to other data devices. For example, the network link 220 may provide a connection through local network 222 to a host computer 224 or to data equipment operated by an Internet Service Provider (ISP) 226. The ISP 226 in turn may provide data communication services through the world-wide packet data communication network now commonly referred to as the "Internet" 228. The local network 222 and the Internet 228 may both use electrical, electromagnetic, or optical signals that carry digital data streams. The signals through the various networks and the signals on the network link 220 are example forms of transmission media. The signals through the communication interface 218 that carry the digital data to and from the computer system 200, is also an example form of transmission media.

The computer system 200 may send messages and receive data, including program code, through the network(s), the network link 220, and the communication interface 218. In the Internet example, the communications server 140 might transmit a requested code for an application program through the Internet 228, the ISP 226, the local network 222, and the communication interface 218.

The received code may be executed by the processor 204 as it is received, and/or stored in the storage device 210 or other non-volatile storage for later execution.

Figure 3:
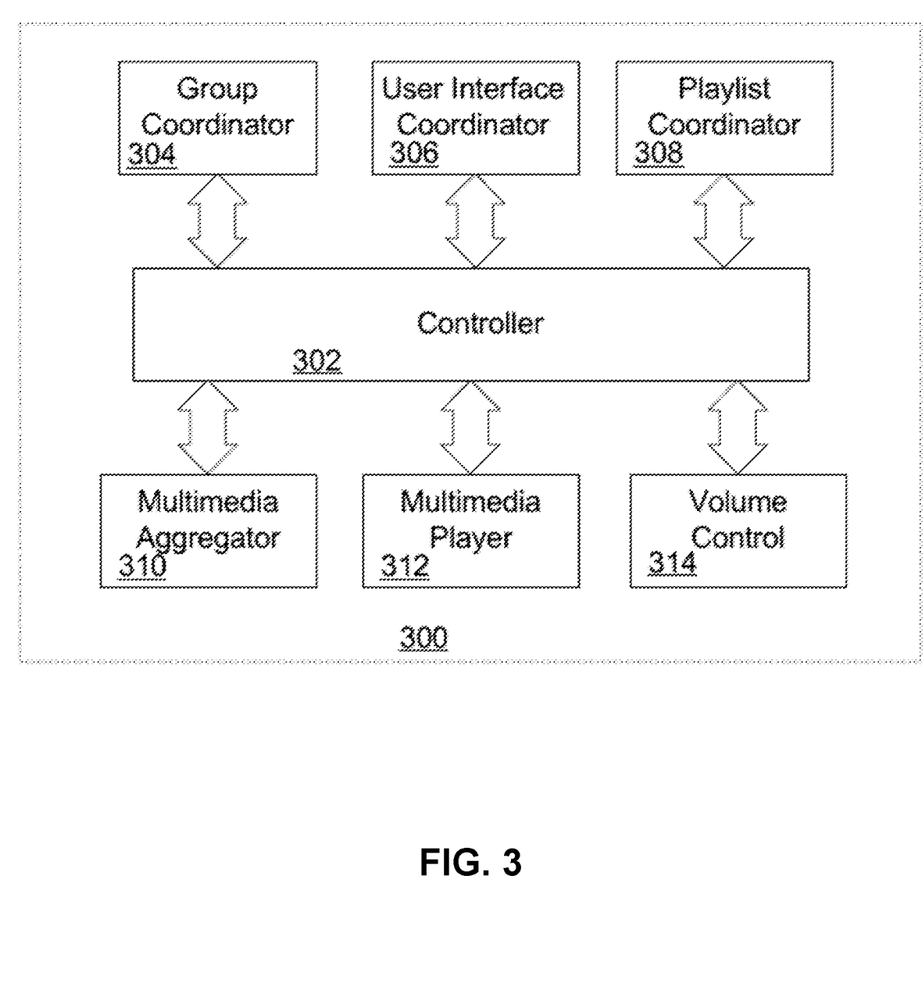
FIG. 3 is a diagram of a group music sharing system, according to some embodiments of the present disclosure.

Referring now to FIG. 3, a diagram of a group music sharing system 300 is shown. In an example, the group music sharing system 300 may be run on the server 140. In another example, the group music sharing system 300 may be run on one of the endpoint devices 102, 110, 120. In yet another example, the group music sharing system 300 may be run on a combination of the server 140 and the endpoint devices 102, 110, 120.

The group music sharing system 300 may include a controller 302 that is coupled to an invitation coordinator 304, a user interface coordinator 306, a playlist coordinator 308, a multimedia aggregator 310, a multimedia player 312, and a volume control 314.

The invitation coordinator 304 may detect an initiation of a group music sharing session by a first participant of the web conferencing session (e.g. group leader) and may poll the remaining participants for inclusion into the group. The invitation coordinator 304 may also track responses from the remaining participants if they wish to participate in the group music sharing session. The invitation coordinator 304 may receive the responses through the endpoint devices 102, 110, 120. The invitation coordinator 304 may further utilize information from the input device 214 and cursor control 216 through the communications interface 218. The group leader may control the music playback in the group music sharing session for all participants of the group. The remaining participants may suggest songs for the group leader to play for the group by queuing them up in a playlist. The first participant may transfer leadership (and control of the music playback) permanently or temporarily to one or more of the remaining participants.

The user interface coordinator 306 may instruct a visual display of a user interface on the display 212 during the video conferencing session. The user interface coordinator 306 may display one or more of live video of the web conference participants, a playlist of songs, cover art, lyrics, and volume control for the music. The user interface coordinator 306 may display these elements on one or more tabs.

The playlist coordinator 308 may receive input from participants of the group music sharing session on which songs they would like to add to the master playlist. The playlist coordinator 308 may utilize information from the input device 214 and cursor control 216 through the communications interface 218. The playlist coordinator 308 may aggregate song selections from one or more participants and may allow the group leader to select one or more songs to play for the group.

The multimedia aggregator 310 may communicate with the multimedia server 150 and may provide the music for participants to select and play. In addition, the multimedia aggregator 310 may provide music information such as song information, artist information, artwork, and lyrics for the participants to view while a song is playing. The multimedia aggregator 310 may receive song data, including the audio and music information from the multimedia server 150 and/or from the endpoint devices 102, 110, 120 themselves. The multimedia aggregator 310 may provide a library of music for the participants to choose from and add to the playlist described below in reference to FIG. 5.

The multimedia player 312 may transmit the music and the music information retrieved by the multimedia aggregator 310 to the participants to create a synchronized music listening experience on the endpoint devices 102, 110, 120. The multimedia player 312 may receive input from the group leader that allows the group leader to fast forward, rewind, and skip tracks. This feature may not be available to the other participants. The user interface coordinator 306 may display the music information on one or more tabs of the user interface.

The volume control 314 may enable participants to control the volume of the music playing independent of the volume of the video conference. The volume control 314 may utilize information from the input device 214 and cursor control 216 through the communications interface 218. The user interface coordinator 306 may display the volume control along with the music information on one or more tabs of the user interface.

Figure 4:
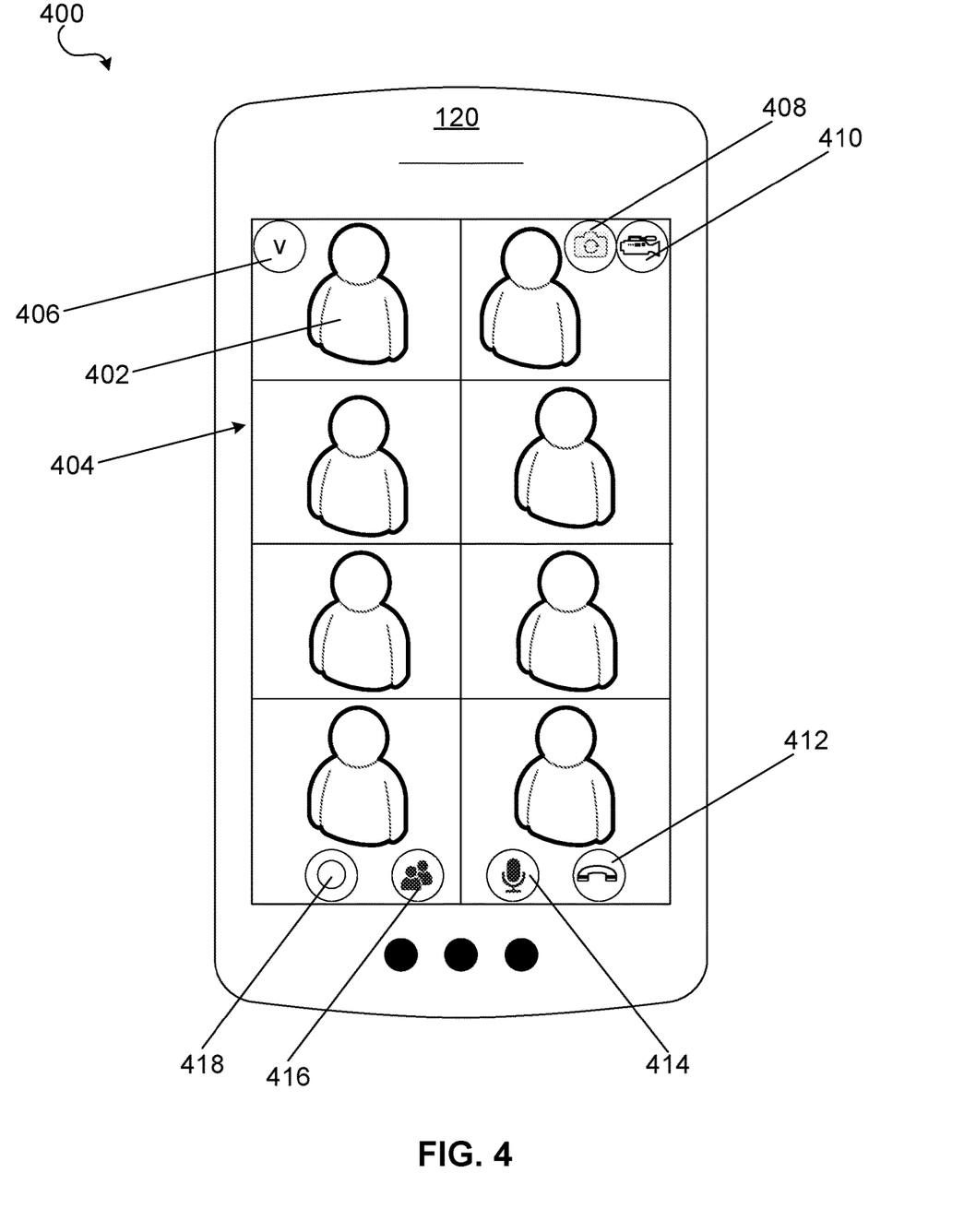
FIG. 4 is a diagram showing live video of web conference participants on one or more tabs of a user interface, according to some embodiments of the present disclosure.

Referring now to FIG. 4, a first tab 404 of an example user interface 400 is shown on the endpoint device 120. As described above, the user interface 400 may be generated and continuously updated by the user interface coordinator 306. In an example, the first tab 404 may include live video of one or more web conference participants 402. The first tab 404 may also include a drop down menu button 406, a reverse camera button 408, an activate/deactivate video button 410, an end button 412, a mute/unmute button 414, a contacts button 416, and a screenshot button 418. It should be noted that these buttons are provided as examples and that the first tab 404 may include any combination of buttons shown and/or additional buttons.

Figure 5:
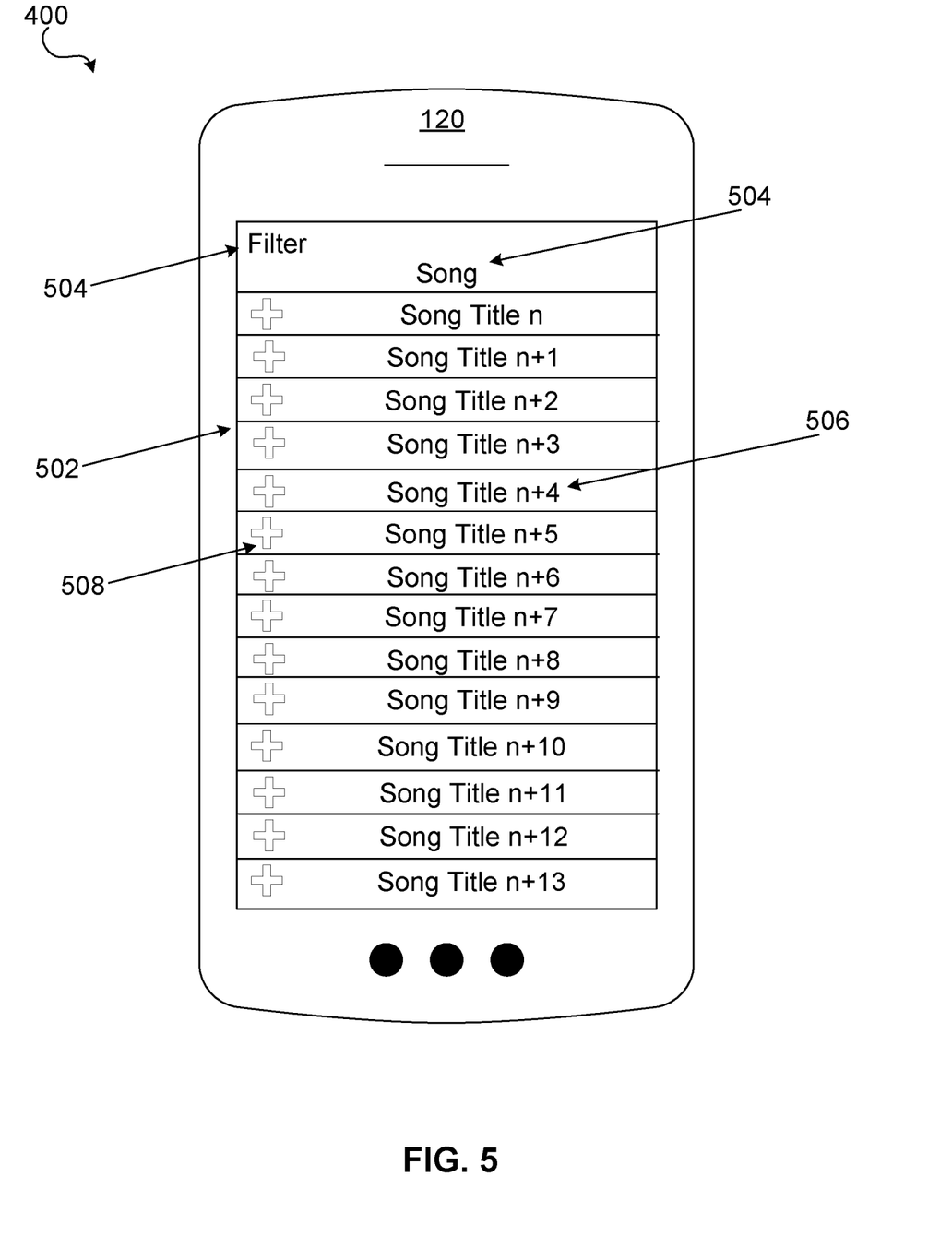
FIG. 5 is a diagram showing a playlist on one or more tabs of the user interface, according to some embodiments of the present disclosure.

Referring now to FIG. 5, a second tab 502 of the user interface 400 is shown on the endpoint device 120. In an example, the second tab 502 may be accessed by the user by swiping in one or more directions on the first tab 404 and/or any other tab displayed. The second tab 502 may include a playlist that may be created/edited by a user in control of the music. The second tab 502 may include a filter button 504 that allows a user to search for a particular artist, song, album, etc. The second tab 502 may include a heading 504 that identifies what the user is reviewing, in this example, songs. The second tab 502 may include a list of one or more song titles 506 and an add button 508 to include the song in the playlist.

Figure 6:
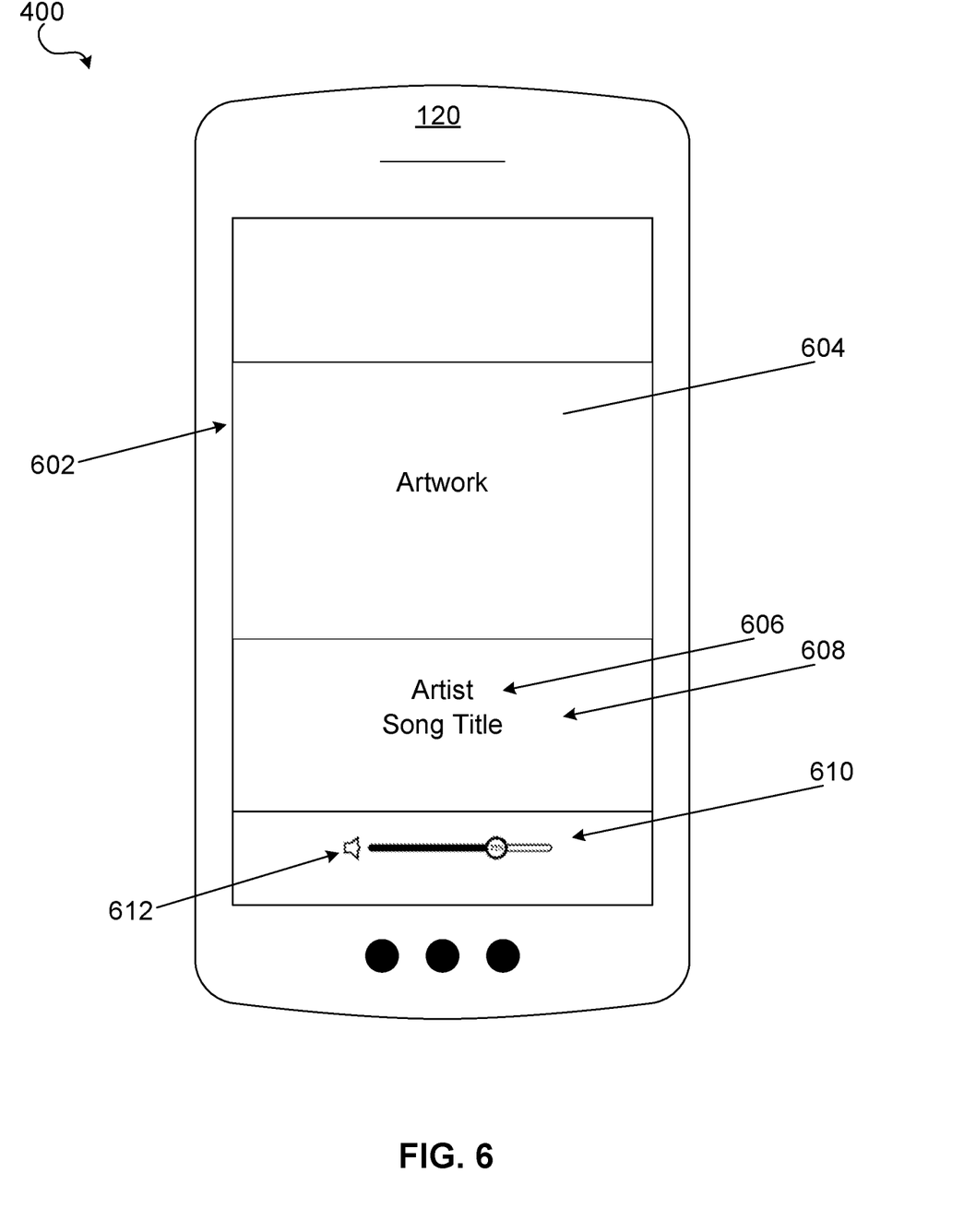
FIG. 6 is a diagram showing music information on one or more tabs of the user interface, according to some embodiments of the present disclosure.

Referring now to FIG. 6, a third tab 602 of the user interface 400 is shown on the endpoint device 120. In an example, the third tab 602 may be accessed by the user by swiping in one or more directions on the second tab 502 and/or any other tab displayed. The third tab 602 may include artwork 604 related to the song being played (e.g., images of an album, an artist being played, a single, etc.). The third tab 602 may also include the artist name 606 and the song title 608. The third tab 602 may also include a volume slider 610 and a mute/unmute button 612. In an example, the volume slider 610 and the mute/unmute button 612 may control volume of the music being played on just the user's device. In another example, the volume slider 610 and the mute/unmute button 612 may control the music for all users.

Figure 7:
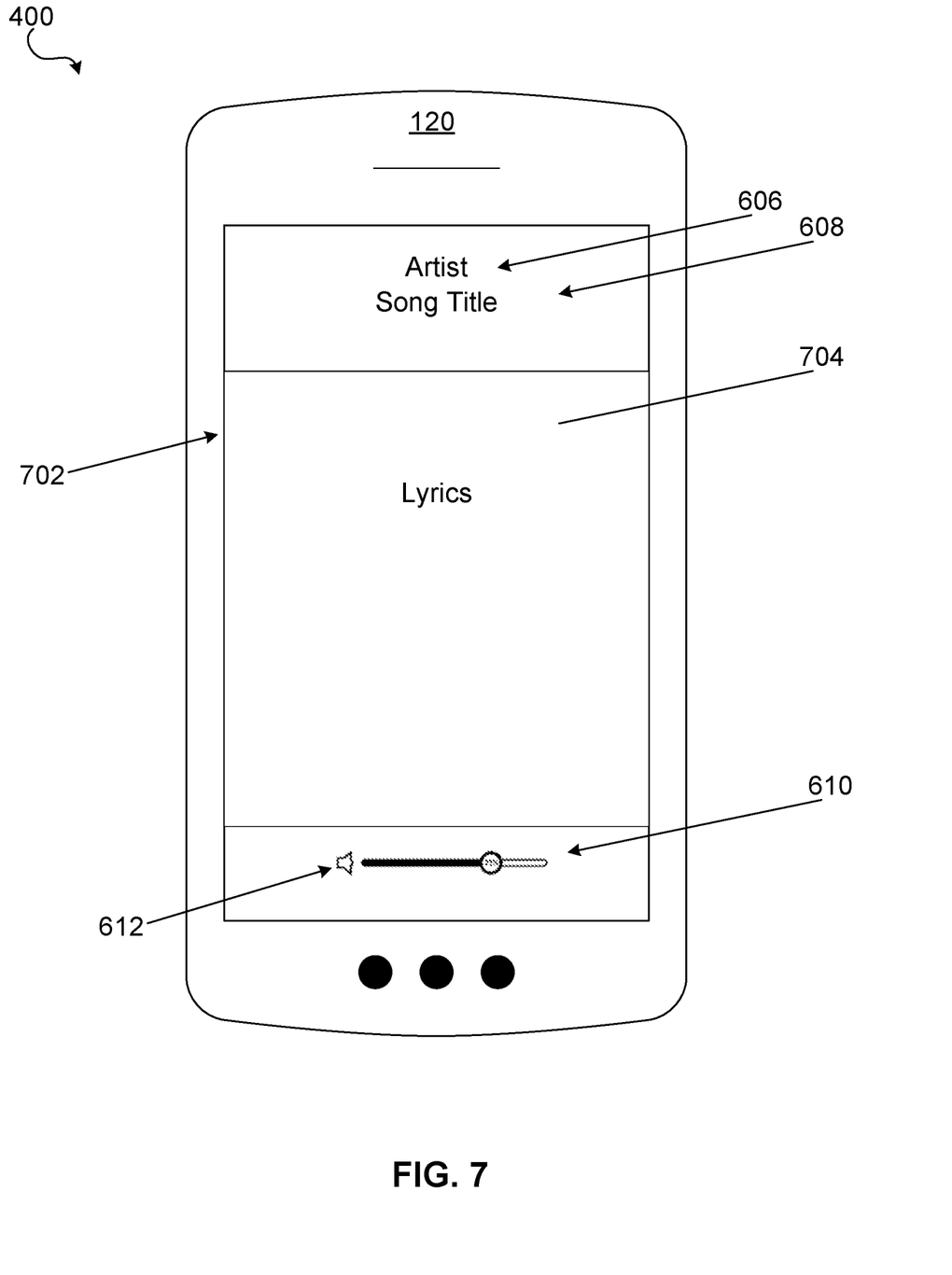
FIG. 7 is a diagram showing lyrics on one or more tabs of the user interface, according to some embodiments of the present disclosure.

Referring now to FIG. 7, a fourth tab 702 of the user interface 400 is shown on the endpoint device 120. In an example, the fourth tab 702 may be accessed by the user by swiping in one or more directions on the third tab 602 and/or any other tab displayed. The fourth tab 702 may include the artist name 606 and the song title 608 as well as song lyrics 704. The fourth tab 702 may also include the volume slider 610 and the mute/unmute button 612. In an example, the volume slider 610 and the mute/unmute button 612 may control volume of the music being played on just the user's device. In another example, the volume slider 610 and the mute/unmute button 612 may control the music for all users.

It should be noted that the first tab 402, second tab 502, third tab 602, and fourth tab 702 described above with reference to FIGS. 4-7 are exemplary and any configuration and/or combination of the information displayed in the tabs may be used.

Figure 8:
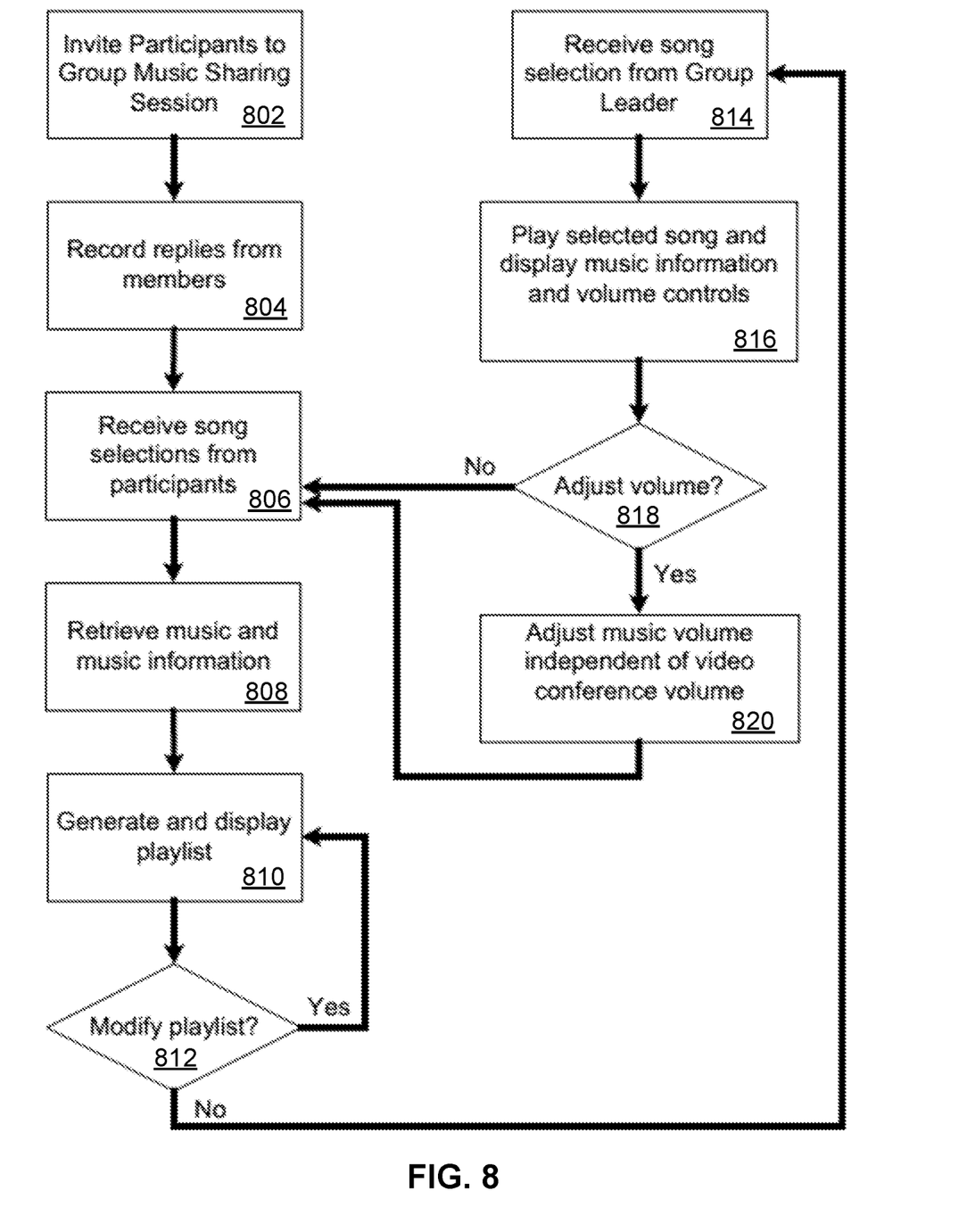
FIG. 8 is a flowchart illustrating a process of creating and operating a group music sharing session; according to some embodiments of the present disclosure.

Referring now to FIG. 8, a flowchart illustrating the process of creating and operating a group music sharing session is shown. Functional blocks are utilized within the flowchart to demonstrate different aspects. These functional blocks may be combined, divided, or removed without narrowing the scope of the invention.

In Step 802, a member of the video conference may initiate a group music sharing session through the group coordinator 304. The group coordinator 304 may receive a request from the initiating member to start the group music sharing session and may transmit invitations to members of the video conferencing session to participate. The group coordinator 304 may transmit the invitations to all members of the video conference or to a subset of members selected by the initiating member.

In an example, the initiating member may play the role of group leader. In another example, the role of group leader may be assigned to another member of the video conferencing session. The initiating member may invite the attendees to the group music sharing session by selecting an invite option during the video conferencing session, which may cause an invitation to be sent to each of the attendees. The invitation may announce the group music sharing session and may allow each of the attendees to accept or decline the invitation to participate in the group music sharing session.

In Step 804, the group coordinator 304 may receive replies to the group music sharing session and may record the responses of each invited member. For example, the acceptance or declination for the group music sharing session for each member is recorded.

In Step 806, the playlist coordinator 308 may receive song selections from participants of the group music sharing session. In Step 808, the multimedia aggregator 310 may retrieve the music and music information from the multimedia server 150 and/or the endpoint devices 102, 110, 120.

In Step 810, the playlist coordinator 308 may generate a playlist using the music and music information retrieved by the multimedia aggregator 310. As described above, the playlist may be displayed by the user interface coordinator 306 as a tab on the user interface shown on the display 212. In an example, the playlist may be shown on a separate tab other than the video conference. In Step 812, the playlist coordinator 308 may receive input from participants and/or the group leader to modify the playlist. For example, participants may add or remove songs. The group leader may add, remove, and/or rearrange the songs on the playlist.

In Step 814, the playlist coordinator 308 may receive input from the group leader selecting a song for simultaneous playback on all of the endpoint devices 102, 110, 120. In Step 816, the multimedia player 312 may transmit the selected song and the music information to the endpoint devices 102, 110, 120. As described above, the music information (e.g., song information, artwork, and lyrics) and volume controls may be displayed by the user interface coordinator 306 as a tab on the user interface shown on the display 212. In an example, the music information and volume controls may be shown on a separate tab other than the video conference.

In Step 818, the participants may have the ability to change the volume of the music playback independently of the volume of the video conference. If the participants are satisfied with the volume of the music playback, the process returns to Step 806. If a participant wishes to change the volume of the music playback, independent of the volume of the video conference, the process moves to Step 820. In this step, the volume control 314 may receive information from the input device 214 and cursor control 216 through the communications interface 218 to allow a participant to adjust the volume. After the participant is satisfied with the volume, the process returns to Step 806.

It should be noted that at any time during the group music sharing session, the group leader may transfer their group leader status to another participant. In an example, there may be multiple group leaders that can control the music playback. Participants may leave the group music sharing session at any time and new participants may join by either submitting a request or receiving an invitation from a current participant.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, subnetworks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module may include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing examples. In other words, functional elements being performed by single or multiple components, in various combinations of hardware and software or firmware, and individual functions, may be distributed among software applications at either the client level or server level or both. In this regard, any number of the features of the different examples described herein may be combined into single or multiple examples, and alternate examples having fewer than, or more than, all of the features described herein are possible.

Functionality may also be, in whole or in part, distributed among multiple components, in manners now known or to become known. Thus, a myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the examples of methods presented and described as flowcharts in this disclosure are provided by way of example in order to provide a more complete understanding of the technology. The disclosed methods are not limited to the operations and logical flow presented herein. Alternative examples are contemplated in which the order of the various operations is altered and in which sub-operations described as being part of a larger operation are performed independently.

While various examples have been described for purposes of this disclosure, such examples should not be deemed to limit the teaching of this disclosure to those examples. Various changes and modifications may be made to the elements and operations described above to obtain a result that remains within the scope of the systems and processes described in this disclosure.

What is claimed is:

1. A method for use in a computer device, the method comprising:
    initiating a web conferencing session during which a video conference is displayed on a user interface of each of a plurality of endpoint devices, each of the endpoint devices being associated with a participant of the video conference, wherein the endpoint devices are each coupled to a communications server that hosts the video conference;
    transmitting, to the endpoint devices, voice information and video information associated with the video conference from the communications server;
    initiating, within the web conferencing session, a group music sharing session with two or more members of the video conference;
    receiving, within the web conferencing session, a song selection from a participant of the group music sharing session;
    retrieving the selected song and music information from a multimedia server;
    streaming the selected song simultaneously to the endpoint devices of the participants from a music streaming service hosted on the multimedia server, wherein the multimedia media server streams the selected song to the endpoint devices separate from the communications server transmitting the voice information and video information to the endpoint devices; wherein the endpoint devices integrate the selected song streamed from the multimedia server into the video conference; and
    displaying the music information on the user interface of each of the endpoint devices.

2. The method of claim 1, further comprising:
    receiving a request from a first participant of the video conference to initiate the group music sharing session.

3. The method of claim 1, wherein one participant is given a status of group leader of the group music sharing session.

4. The method of claim 3, wherein the status of group leader is assignable to any of the participants of the group music sharing session by a participant currently holding status of group leader.

5. The method of claim 1, wherein the initiating the group music sharing session comprises: transmitting invitations to two or more members of the video conference; and creating a group of the participants based on received responses.

6. The method of claim 1, wherein the video conference includes at least three endpoint devices.

7. The method of claim 1, wherein the music information comprises one or more of song information, artist information, artwork, and lyrics.

8. The method of claim 1, wherein the video conference is displayed along with a playlist and the music information.

9. The method of claim 1, further comprising:
    displaying a volume control on the user interface of the endpoint devices;
    receiving input to the volume control from an endpoint device of a participant; and adjusting a volume of the music on the endpoint device of the participant independently of a volume of the video conference.

10. A system comprising:
    a communications server configured to:
        initiate a web conferencing session during which a video conference is displayed on a user interface of each of a plurality of endpoint devices, each of the endpoint devices being associated with a participant of the video conference, wherein the endpoint devices are each coupled to the communications server, and the communications server hosts the video conference;
        transmit, to the endpoint devices, voice information and video information associated with the video conference;

initiate, within the web conferencing session, a group music sharing session with two or more members of the video conference;

receive, within the web conferencing session, a song selection from a participant of the group music sharing session;

a multimedia server that streams the selected song simultaneously to the endpoint devices of the participants from a music streaming service hosted on the multimedia server, wherein the multimedia media server streams the selected song to the endpoint devices separate from the communications server transmitting the voice information and video information to the endpoint devices; wherein the endpoint devices integrate the selected song streamed from the multimedia server into the video conference; and wherein the music information is displayed on the user interface of each of the endpoint devices.

11. The system of claim 10, wherein the processor when executing the instructions is further configured to: receive a request from a first participant of the video conference to initiate the group music sharing session.

12. The system of claim 10, wherein one participant is given a status of group leader of the group music sharing session.

13. The system of claim 12, wherein the status of group leader is assignable to any of the participants of the group music sharing session by a participant currently holding status of group leader.

14. The system of claim 10, wherein the group music sharing session is initiated by transmitting invitations to the two or more members of the video conference; and a group of the participants is created based on received responses.

15. The system of claim 10, wherein the video conference includes at least three endpoint devices.

16. The system of claim 10, wherein the music information comprises one or more of song information, artist information, artwork, and lyrics.

* * * * *